(12) United States Patent
Vartiainen

(10) Patent No.: US 6,275,592 B1
(45) Date of Patent: Aug. 14, 2001

(54) METHOD AND AN ARRANGEMENT FOR ATTENUATING NOISE IN A SPACE BY GENERATING ANTINOISE

(75) Inventor: Jukka Vartiainen, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/136,128

(22) Filed: Aug. 18, 1998

(30) Foreign Application Priority Data

Aug. 22, 1997 (FI) ..................................... 973455

(51) Int. Cl.[7] .......................... A61F 11/06; G10K 11/16; H03B 29/00
(52) U.S. Cl. ........................................... 381/71.11
(58) Field of Search ............... 381/71.11, 71.12, 381/71.8, 71.4, 71.13; 708/322

(56) References Cited

U.S. PATENT DOCUMENTS

| | | | |
|---|---|---|---|
| 4,672,674 | * 6/1987 | Clough et al. | 381/71.12 |
| 5,285,165 | 2/1994 | Renfors et al. | |
| 5,406,635 | 4/1995 | Jarvinen | |
| 5,426,703 | * 6/1995 | Hamabe et al. | 381/71.12 |
| 5,633,795 | 5/1997 | Popovich | |
| 5,754,662 | * 5/1998 | Jolly et al. | 381/71.11 |
| 5,852,667 | * 12/1998 | Pan et al. | 381/71.11 |

OTHER PUBLICATIONS

Patent Abstracts of Japan, vol. 18, No. 441 (P–1788), Aug. 1994.
Patent Abstracts of Japan, vol. 18, No. 50 (P–1683), Jan. 1994.
Finnish Search Report.

* cited by examiner

Primary Examiner—Xu Mei
(74) Attorney, Agent, or Firm—Perman & Green, LLP

(57) ABSTRACT

The invention relates to a method and an arrangement for attenuating noise by antinoise. According to the invention the object is to attenuate the noise by weighting such frequencies, at which the noise is most disturbing. At other frequencies the noise is attenuated less or not at all. This saves power in the equipment and a stronger subjective attenuation is obtained that without frequency weighting. The system can be applied in a mobile station so that the speech heard from the mobile station can be distinguished from the environmental noise.

5 Claims, 5 Drawing Sheets

METHOD AND AN ARRANGEMENT FOR ATTENUATING NOISE IN A SPACE BY GENERATING ANTINOISE

BACKGROUND

1. Field of the Invention

The object of the invention is a method defined in the preamble of claim 1, an arrangement defined in the preamble of claim 5 for attenuating noise in a space by generating antinoise, and a mobile station defined in the preamble of claim 10.

2. Description of the Prior Art

Noise absorbing and isolating materials are generally used for noise attenuation. In some rooms the material required for the attenuation occupies too much space or is otherwise difficult to locate. This has been the reason to develop active noise attenuation systems where the system measures the noise and supplies antinoise into the same room. The object is to use the antinoise to attenuate the noise caused by the noise source. In an ideal case the interference of the noise and the antinoise is zero.

There are known active adaptive noise attenuation systems which from a noise reference generate an antinoise signal to be supplied to a speaker. The operation of the system is adapted on the basis of the residual noise, so that the residual noise will be as low as possible. The residual noise is measured with an error microphone included in the system. The noise reference describes the unattenuated noise caused by the noise source, which is measured with a second microphone, or which is generated from the error signal obtained from the error microphone. Alternatively the noise reference is obtained with another transducer, such as an acceleration transducer which provides information about the noise source. Then the noise caused by the noise source is deduced from its movements.

The Filtered-X LMS (Least Mean Square) algorithm is the algorithm most commonly used in adaptive noise attenuation systems. The attenuation arrangement realised with the aid of this algorithm is shown in FIG. 1. With the LMS algorithm the object is to minimise the power of the residual noise. The estimating filter 1 contains the estimate C' of the acoustic response C of the space where the noise occurs. The acoustic response C of a space means that effect, which the space has on the sound supplied to the space. The signal r processed by the estimate filter 1 is supplied to the first input of the calculating unit 2. The residual noise signal e is supplied to the second input of the calculating unit. The calculating unit contains the LMS algorithm. The calculating unit 2 calculates a control signal, which controls the adaptive filter 3, whereby the calculation is based on the signals supplied to it and on predetermined constant values. The noise reference x is supplied to the input of the adaptive filter 3. The calculating unit 2 and the adaptive filter 3 form together a digital unit 6, which in the inputs and the outputs has A/D converters and D/A converters, respectively. The adaptive filter 3 is a digital filter, such as a FIR filter (Finite Impulse Response), whose coefficients are suitably modified by the calculating unit 2. The adaptive filter 3 provides a speaker signal ka, which changes in the space 4 according to the acoustic response C and which is added 5 to the noise occurring in the space. This results in the error signal or the residual noise e, which is supplied to the second input of the calculating unit 2.

When said algorithm is used the adaptive FIR filter supplies at its output $$y[n]=w_0[n]x[n]+w_1[n]x[n-1]+w_2[n]x[n-2]+ \quad (1)$$

where x[n] is the input signal or the noise reference at the moment n, and the filter coefficients $w_k$ are updated according to the formula $$w_k[n+1]=w_k[n]-2\mu e[n]r[n-k] \quad (2)$$

where n is the sampling moment of the digital filter, $\mu$ is a constant step length, e is the error signal, and r is the filtered reference signal x, which is filtered by the electroacoustic response estimating filter. In the formulas k is a finite number series from zero to the positive limit. A more comprehensive description of adaptive signal processing is presented in Widrow B., Stearns S. D., Adaptive Signal Processing, Prentice-Hall, 1985.

A problem of the known adaptive noise attenuation systems is that there is a substantial amount of residual noise which can be heard, and that the power required for the sound pressure which is needed to generate the antinoise is high compared to the attenuation result.

SUMMARY OF THE INVENTION

The object of the invention is to obviate said disadvantages.

The method according to the invention is characterised in what is presented in claim 1. The adaptive noise attenuation system according to the invention is characterised in what is presented in claim 5. The mobile station according to the invention is characterised in what is presented in claim 10. Preferred embodiments of the invention are presented in the dependent claims.

An object of the invention is a method for attenuating noise in a space by generating antinoise. According to an advantageous embodiment of the invention the method comprises the steps to:

- determine the noise reference,
- determine the weighting function,
- determine the estimate function of the electroacoustic response of the space,
- process the noise reference with the weighting function and with the estimate function of the electroacoustic response in order to generate a first signal,
- measure the residual noise, which is formed as a result of the interaction between the noise prevailing in the space and the antinoise supplied into the space,
- process the residual noise with the weighting function in order to generate a second signal,
- filter the noise reference adaptively and supply the obtained speaker signal into the space, whereby the adaptive filtering is controlled based on the first signal and the second signal so that the second signal or the weighted residual noise is minimised, and the adaptively filtered signal is supplied as antinoise into the space.

The estimate function of the electroacoustic response is determined so that a test signal, such as 1/f-noise or white noise, is supplied to the D/A converter of the equipment, at the same time the signal obtained from the A/D converter connected to the error microphone is stored, the transfer function or the impulse response between the test signal and the measured signal is estimated, preferably by using an LMS algorithm, whereby the estimate filter C' is realised as a digital FIR filter using filter coefficients which are obtained directly from the estimation. The coefficients of the FIR filter directly provide its impulse response. The use of the LMS algorithm is presented in the book: Widrow B., Stearns S. D., Adaptive Signal Processing, Prentice-Hall, 1985.

In a preferred embodiment of the invention the noise reference is generated so that the antinoise signal of the space's electroacoustic response is subtracted from the residual noise signal, when the antinoise signal is processed with the estimate function.

In an embodiment of the method for adaptive filtering of the noise reference the coefficients $w_k$ of the adaptive filter function are determined by the formula:

$$w_k[n+1]=w_k[n]-2\mu e_H[n]r_H[n-k] \quad (3)$$

where n is the sampling moment of the digital filter, $\mu$ is a constant step length, $e_H$ is a second signal or the residual noise signal weighted with the weighting function, and $r_H$ is a first signal or the filtered reference signal x, which is filtered by the weighting function and the electroacoustic response estimate function. In one embodiment of the invention said weighting function, or the corresponding weighting filter, is a function which takes into account the frequency sensitivity of the human hearing, whereby it generates a maximum total attenuation of the noise at a frequency of substantially 1000 Hz.

An object of the invention is also a noise attenuation arrangement. According to an advantageous embodiment of the invention the arrangement comprises means to generate a noise reference, a first weighting filter for processing the noise reference on the basis of a predetermined weighting function in order to generate a weighted noise reference, an estimate filter in order to further process the weighted noise reference on the basis of the electroacoustic response of the space in order to generate a first signal, a noise transducer for measuring the residual noise in the space, whereby the residual noise is formed by the interaction of the noise and the antinoise supplied into the space, a second weighting filter for processing the residual noise signal measured from the residual noise by the noise transducer in order to generate a second signal, an adaptive filter for treating the noise reference into a first speaker signal which generates the antinoise signal, and a calculating unit for controlling on the basis of the first signal and the second signal the treatment of the noise reference in the adaptive filter. The first weighting filter and the estimate filter can be combined into the same filter.

In an embodiment of the invention the means for generating a noise reference comprises a microphone. Alternatively the means for generating a noise reference comprises a vibration transducer.

In an embodiment of the invention the adaptive filter comprises a weighting filter for filtering the noise reference. In this case the noise reference, which is supplied also to the adaptive filter, is filtered with a weighting filter before the continued processing, in the same way as in the signal path to the LMS algorithm unit before the estimating unit.

In an embodiment of the invention the means for generating the noise reference comprises means for processing the antinoise signal with the estimate function of the electroacoustic response in order to generate a first feedback signal, means for generating a second feedback signal from the residual noise signal, and means for generating a noise reference on the basis of the difference between the first and the second feedback signals.

In one embodiment of the invention the noise transducer comprises a microphone. The invention relates also to a mobile station including one of the above mentioned arrangements.

An advantage of the invention is that a subjective noise attenuation, a noise attenuation detected by a human and/or an animal is effective when the hearing characteristics are taken into account when the attenuation is weighted.

A further advantage of the invention is that the noise attenuation system does not require as much power as an unweighted system capable of the same subjective attenuation.

BRIEF DESCRIPTION OF THE DRAWINGS

The invention is described in detail below with reference to the enclosed drawing, in which

FIG. 5 shows in a block diagram such parts of the arrangement according to the invention which are essential for the invention;

FIG. 6 shows in a logarithmic frequency co-ordinate system a weighting function which is used in the invention;

DETAILED DESCRIPTION OF THE INVENTION

Figure 1:
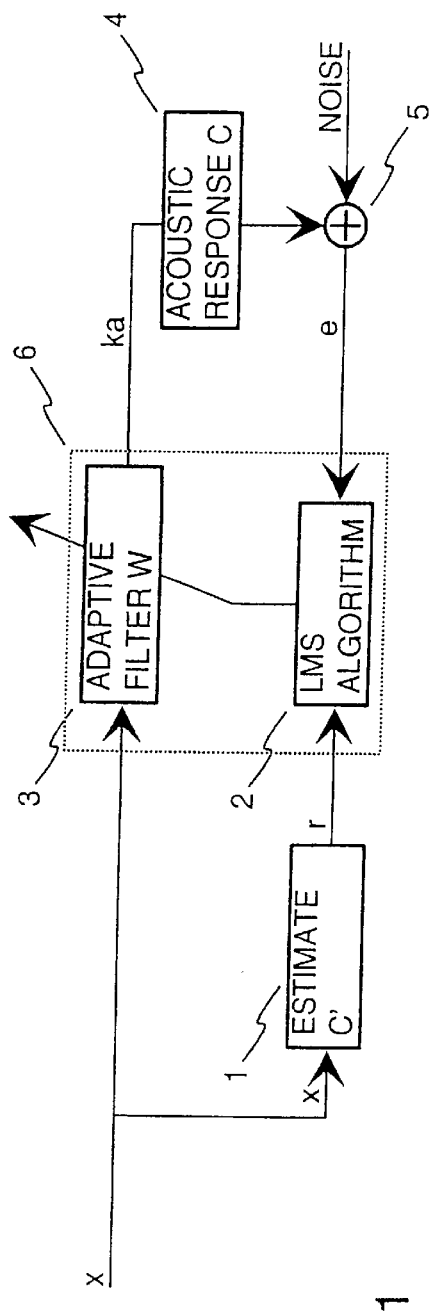
FIG. 1 shows the block diagram of a previously known adaptive noise attenuation arrangement.

FIG. 1 was described above in the part of the description treating the prior art.

Figure 2:
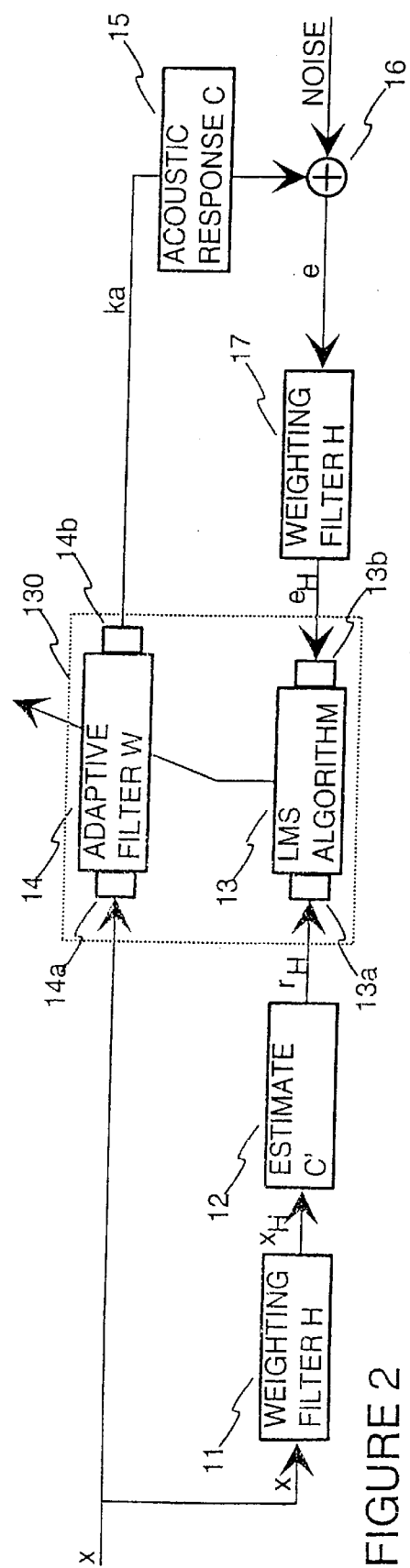
FIG. 2 shows the block diagram of an adaptive noise attenuation arrangement according to the invention.

FIG. 2 shows the block diagram of an adaptive noise attenuation system according to an advantageous embodiment of the invention. The arrangement comprises means for generating a noise reference x. This can be a suitable noise reference source, such as a noise reference microphone with amplifiers, with the aid of which an external noise reference signal can be obtained. The arrangement further comprises a first weighting filter 11 for processing the noise reference signal x with the aid of a predetermined weighting function H in order to generate a weighted noise reference $X_H$, and an estimate filter 12 in order to further process the weighted noise reference $X_H$ on the basis of the electroacoustic response C' of that space where the noise should be attenuated, whereby this results in a first signal $r_H$. The arrangement also comprises a noise transducer 16 for measuring the residual noise e in the space. The residual noise e is formed by the interaction of the noise in the space and the antinoise supplied into the space. Further the arrangement comprises a second weighting filter 17 for processing the residual noise signal e measured from the residual noise e with the noise transducer 16, whereby this provides as a result a second signal $e_H$. The arrangement also comprises an adaptive filter 14 for treating the noise reference x into an antinoise signal ka and the corresponding speaker signal. The core of the arrangement is the calculating unit 13. This unit controls the treatment of the noise reference x in the adaptive filter 14 on the basis of the first signal $r_H$ and the second signal $e_H$.

The adaptive filter 14 provides the speaker signal ka, which changes in a manner corresponding to the acoustic response C of the space and which is added 16 to the noise occurring in the space. This results in an error signal or the residual noise signal e. The object is to minimise this residual noise signal with the arrangement according to the invention.

In the arrangement of FIG. 2 the calculating unit 13 and the adaptive filter 14 form a digital unit 130 the first and the second signals $r_H, e_H$ obtained from the estimate filter 12 and the second weighting filter 17 are analogue signals, whereby they must be converted into digital signals by the A/D converters 13a, 13b so that the calculating unit 13 can process them. Correspondingly the analogue noise reference signal x must be converted into a digital form with the A/D converter 14a before it can be supplied to the adaptive filter 14. The output signal of the adaptive filter 14 is in turn a digital signal and it is converted into analogue form by the D/A converter 14b in order to produce the speaker signal ka.

The weighting filter 11, 17 and the estimate filter 12 are in this application analogue filters, but they can also be realised as digital filters. Then of course the A/D converters 13a, 13b are moved to the input side of the filters, so that the analogue signals are fed through these converters into the sections of the digital arrangement.

The acoustic response C comprises the acoustic transfer function from the speaker to the microphone and further a D/A converter, an analogue amplifier, a speaker, a microphone, a microphone amplifier, an A/D converter and the total transfer function of any analogue filters.

The weighting filters 11 and 17 are preferably identical filters, and further they imitate the human ear's frequency sensitivity, so that the strongest noise attenuation occurs at the most sensitive frequency.

Figure 3:
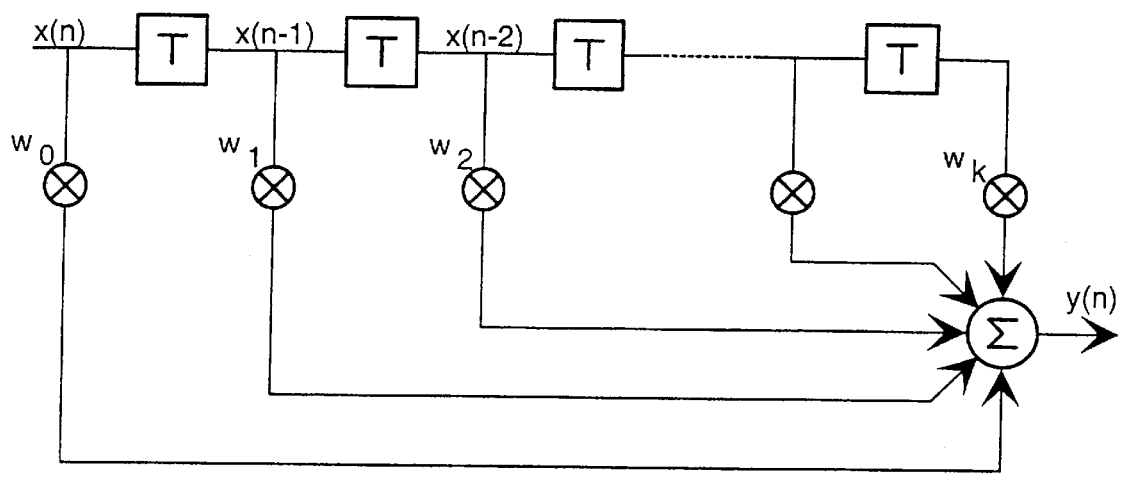
FIG. 3 shows schematically an adaptive filter.

FIG. 3 shows schematically an adaptive FIR filter 14. The digital input signal c is arranged to pass through constant delay elements T, whereby the input signal is transformed into a series of time delayed signals $x(n-1), x(n-2), \ldots, x(k)$. The signals in the series are weighted by coefficients $w_k$ ($k=0, 1, 2, 3, \ldots$) and added in the summing means $\Sigma$, and this results in the output signal $y(n)$, or as a formula:

$$y(n)=w_0(n)x(n)+w_1(n)x(n-1)+w_2(n)x(n-2)+\ldots+w_k(n)x(n-k) \quad (4)$$

When the calculating unit 13 utilises said LMS algorithm the coefficients $w_k$ of the adaptive FIR filter (Finite Impulse Response) 14 are updated according to the invention with the formula $$w_k[n+1]=w_k[n]-2\mu e_H[n]r_H[n-k] \quad (5)$$

where n is the sampling moment of the digital filter, $\mu$ is a constant step length, $e_H$ is the second signal or the residual noise signal e weighted with the weighting filter 17, and $r_H$ is the first signal or the filtered noise reference signal x, which is filtered by the weighting filter 11 and the electroacoustic response estimate filter 12.

Figure 4:
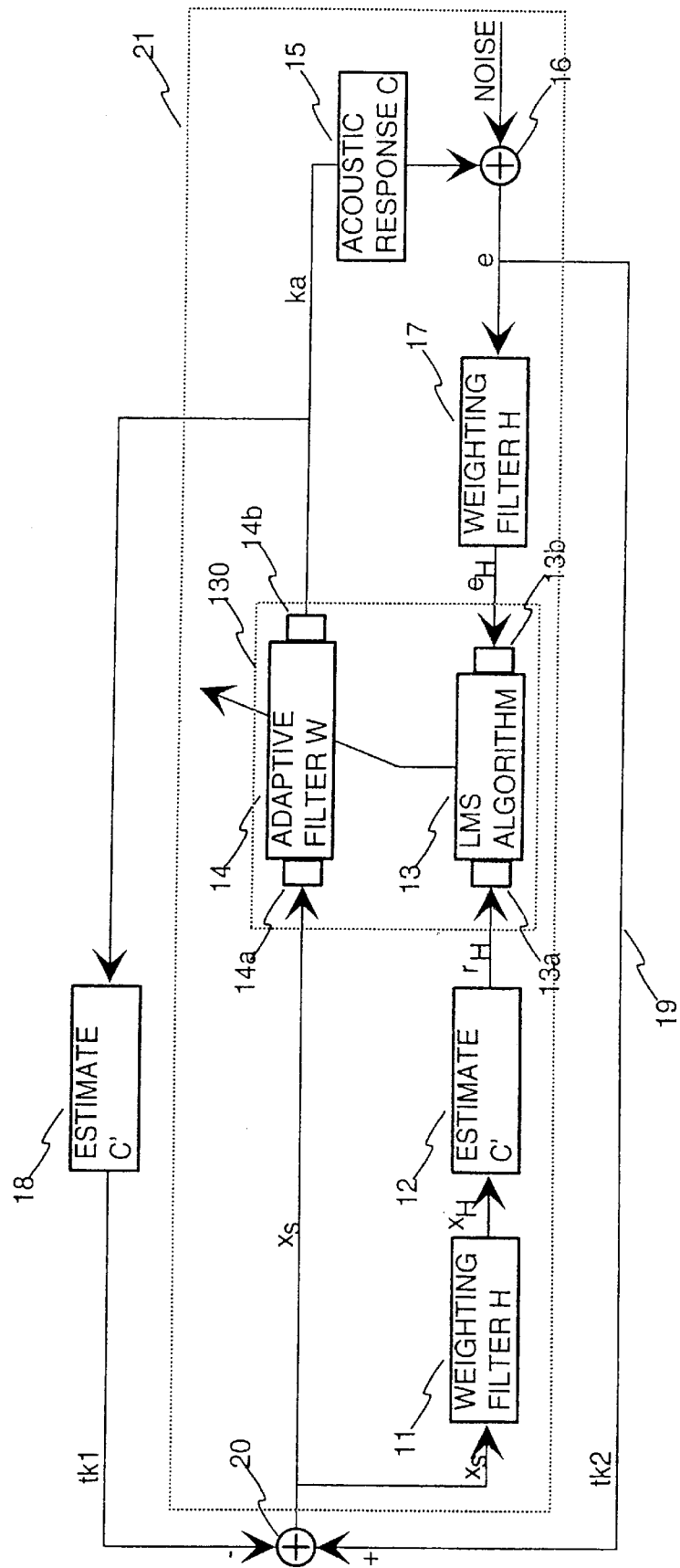
FIG. 4 shows the block diagram of another adaptive noise attenuation arrangement according to the invention.
Figure 3:
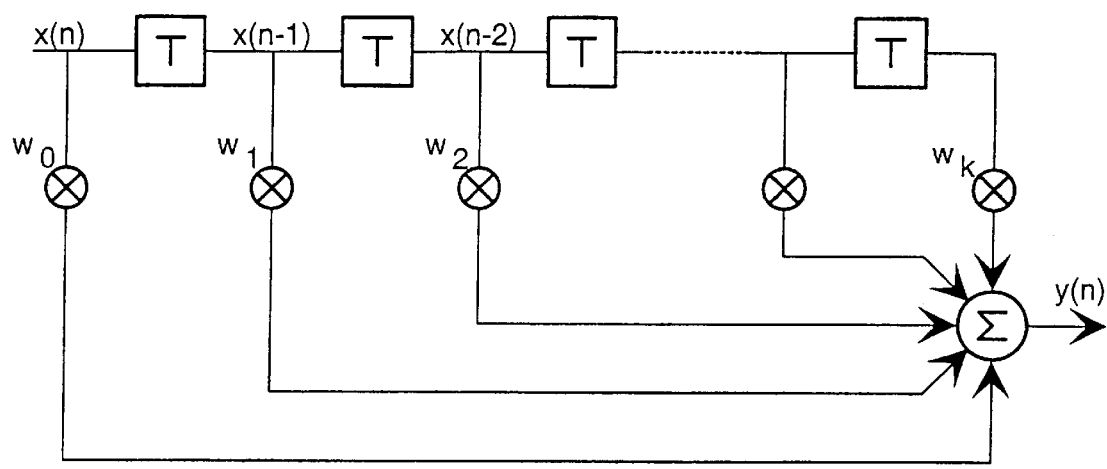
Figure 7:
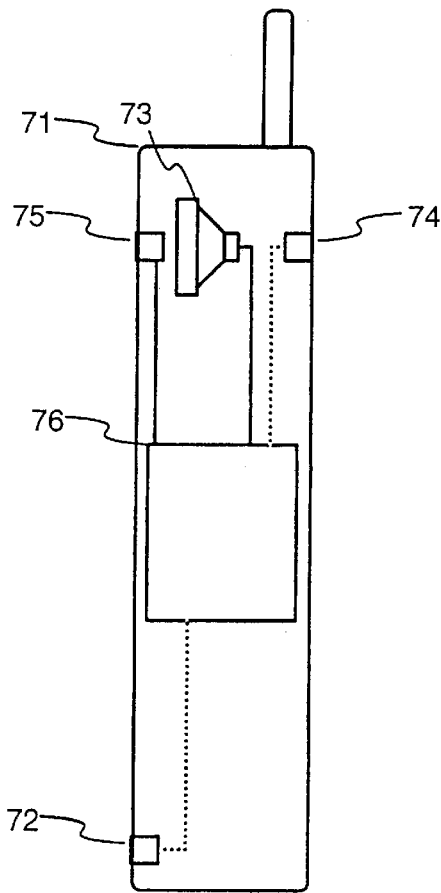

FIG. 4 shows the block diagram of another adaptive noise attenuation arrangement according to a further advantageous embodiment the invention. The external noise reference x is not used in this arrangement, as in the arrangement of FIG. 2, but an internal noise reference $x_s$ is generated. The internal noise reference $x_s$ is generated so that the speaker noise signal or the antinoise signal ka is subtracted from the residual noise signal e, whereby the antinoise signal ka is treated with the estimate function C' of the electroacoustic response of the space, or filtered in a certain manner.

The means for generating the internal noise reference xs comprises first means 18 for processing the antinoise signal ka with the estimate function C' of the electroacoustic response in order to generate a first feedback signal tk1, second means 19 for generating a second feedback signal tk2 from the residual noise signal e, and means 20 for generating the noise reference x from the difference tk2−tk1 between the first feedback signal tk1 and the second feedback signal tk2. The first means comprises an estimate filter 18, through which the antinoise signal ka is connected as the first feedback signal tk1 to the difference means 20 operating as the third means. This estimate filter 18 is similar to the above presented estimate filter 12. The second means 19 comprises a direct connection from the residual noise transducer 16 to the difference means 20, whereby the residual noise signal e directly forms the second feedback signal tk2. The difference means 20 generates the difference between the feedback signals tk2, tk1 and provides the internal noise reference signal, or $x_s$=tk2−tk1. The internal noise reference $x_s$ is supplied instead of the noise reference x as an internal noise reference to the arrangement 21 according to FIG. 2.

FIG. 5 shows a block diagram of an advantageous embodiment of the invention. The arrangement comprises a digital signal processor (DSP) 41, which concerning the calculation realises at least the adaptive filter 13 and the calculation unit 14 (ref. FIGS. 2 and 4). The arrangement also comprises a read only memory (ROM) 42 for storing the software required by the adaptive filter 13 and the calculation unit 14. The arrangement further comprises a random access memory (RAM) 43 for storing and reading at least the intermediate results of the adaptive filter. The arrangement comprises a D/A converter 44 (ref. 14b, FIGS. 2 and 4) for converting the digital signal into a suitable form for the speaker, an amplifier 45 for amplifying the poise, a speaker 46 for supplying the antinoise into the space, an A/D converter 47 for converting the analogue signal into a digital form suitable for the processor 41, a microphone amplifier 48 for amplifying the weak signal to a level sufficient for the transducer, a microphone 49 for detecting the residual noise, a digital bus 50 for realising the communication between the sections. The processing unit 51 as a whole is outlined by a broken line. The processing capacity of the signal processor is preferably 15 MIPS (Million Instructions Per Second). Preferably the sound is sampled at a frequency of 24 kHz. The transducers must be fast, because the phase of the antinoise must follow the original noise as closely as possible, and the amplitude must act in the opposite direction.

FIG. 6 shows in a logarithmic frequency co-ordinate system a weighting function which is used in one advantageous embodiment of the invention. The weighting of the attenuation is realised with the weighting filters 11, 17. Let's examine for instance the human hearing range, which for a person with normal hearing is the frequency range from 20 to 20,000 Hz. This is shown in the figure as the limits 61 and 62. When a person grows old the hearing sensitivity decreases, particularly at the higher end of the frequency range, whereby the limit of the hearing range moves to a lower frequency. There are very few persons over 60 years old who still can hear frequencies over 8,000 Hz. The hearing threshold of a normal person is at its lowest, or the weakest sound are heard, when the frequency of the sound is about 2,000 Hz, whereby the hearing threshold of most people is close to 0 dB. At the higher and the lower limit of the hearing range the hearing threshold is about 80 dB. Some domestic animals, such as dogs and cats, have a hearing with a range which is substantially wider than the human hearing range, whereby their higher limit is 60,000 Hz, and more sensitive than the human hearing in a wide range.

With the aid of the invention it is possible to take into account the human hearing characteristics and alternatively also the hearing characteristics of domestic animals, so that the most effective attenuation is in the human hearing range or in the range common to both. The most effective attenuation is made at the frequency range of the lower hearing threshold, preferably at 100 to 2,000 Hz. The aim is to have in this range an antinoise, which cancels the noise as well as possible, whereas power is saved at other frequencies by generating an antinoise which only partially cancels the noise. This is shown as an attenuation weighting characteristics 63, whose value is 1 at the lower hearing threshold and otherwise a lower value. Thus the hearing range/ranges is effectively attenuated, and outside the hearing range/ranges there is residual noise, which has a minor significance to the listener.

Figure 7:
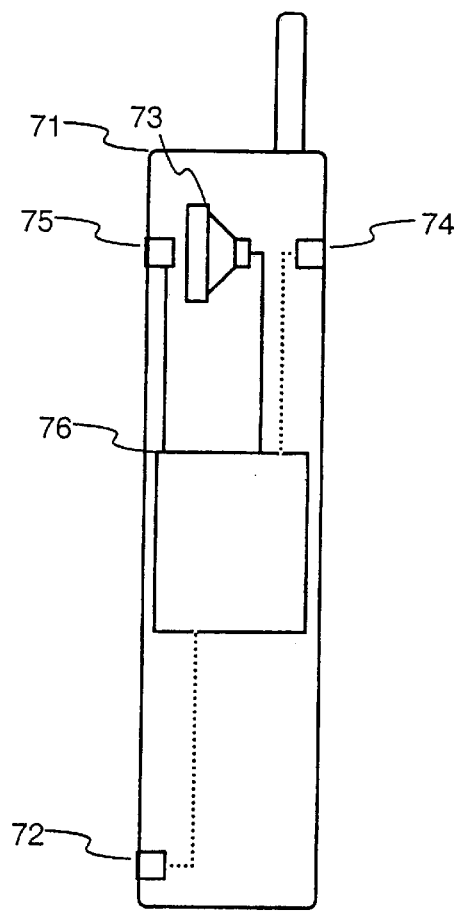
FIG. 7 shows in section such parts of a mobile station according to the invention which are essential regarding the invention.

FIG. 7 shows a further advantageous embodiment of the invention, namely a mobile station 71, in which an arrangement for attenuating noise is used. According to prior art the mobile station 71 comprises a voice microphone 72 and an earphone 73, and according to an advantageous embodiment of the invention it comprises a first additional microphone 74, which detects the noise reference, and a second additional microphone 75, which detects the residual noise e. The first additional microphone 74 is acoustically located as far away as possible from the voice microphone 72 and the earphone 73, in practice on the backside of the mobile station 71. Thus the user's voice and the sound from the earphone 73 should affect the noise detected with the first additional microphone 74 as little as possible. There is also shown a processing unit 76, which corresponds to the processing unit 51 in FIG. 5. In a minimum case only the earphone 73 and the second additional microphone 75 are connected to the processing unit 76. Also the voice microphone 72 and the first additional microphone 74 can be connected to processing unit 76, if it contains the corresponding microphone amplifiers, AID converters and software.

According to one advantageous embodiment of the invention, a noise attenuation arrangement is applied in the mobile station 71 so that the earphone 73 is supplied with noise, which is opposite to the environment and has a level which causes the environmental noise to be attenuated at the user's ear. In a noisy environment the user can thus more clearly hear the voice from the earphone 73 of the mobile station 71.

It is also possible to process the signal from the voice microphone 72 of the mobile station, so that the environmental noise is attenuated, w hereby in the most preferred case only the user's voice will be left.

Only one weighting function was presented above, but it is possible to establish a plurality of weighting functions. The selection of these is affected i.a. by the function of the ear, the assumed noise spectrum, and the structure of the noise attenuation system, particularly regarding, the manner in which the noise reference is generated. When the lower frequencies are attenuated the high frequency noise tends to be amplified, due to causality reasons, when only one microphone is used, and this must be taken into account in establishing the weighting function. When two microphones are used the reference signal appears slightly earlier than the error signal, and then it also has a weak correlation with the actual noise reference at high frequencies, which also due to causality reasons results in the amplification of high frequency noise, but however, less than when only one microphone is used, and thus also this must be taken into account in establishing the weighting function. If the error signal is minimised without weighting it will in many cases result in an essentially strong amplification of the high frequency noise. A person will sense the central frequencies with a very high sensitivity, and the hearing acts substantially differently in different frequency ranges, so that even a small noise amplification at high frequencies is subjectively inconvenient for a person.

When two microphones are used the weighting function is most preferably a filter which whitens the 1/f distribution and which has a response directly proportional to the frequency. This can be approximated by a digital differentiator, where the output is obtained by subtracting from a signal its previous value, in other words y[n]=x[n]−x[n−1].

Figure 8:
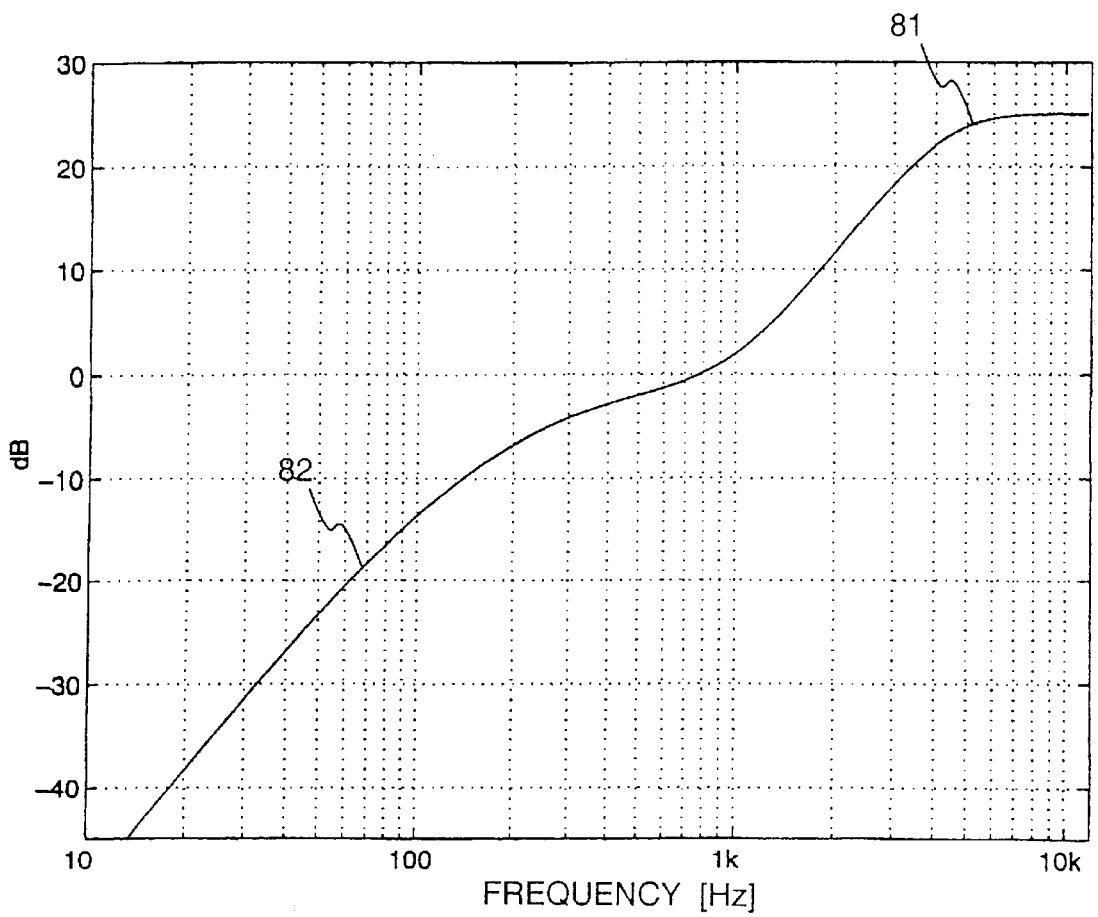
FIG. 8 shows in a logarithmic frequency co-ordinate system another weighting function which is used in the invention.

FIG. 8 shows the response of another weighting function, which is an adaptation of the differentiator. When one microphone is used the weighting function will most preferably weight the higher frequencies 81 more than the differentiator, because the system tends to whiten the spectrum of the residual noise. This will further reduce the causal amplification of the noise level at higher frequencies, and also improve the stability of the system. At the same time the low frequencies 82 below 100 Hz must be more strongly attenuated.

The invention is not limited to the above presented embodiment examples, but many modifications are possible within the inventive idea defined by the claims. For instance the above mentioned Filtered-X LMS algorithm can be replace with any other suitable adaptive algorithm, and the frequency weighting can also be selected so that it takes into account the hearing of an animal.

What is claimed is:

1. A method for attenuating noise in a space by generating antinoise, characterised in that, it comprises the steps to:

determine a noise reference, determine a weighing function, determine an estimate function of an electroacoustic response of the space, process the noise reference with the weighting function and with the estimate function of the electroacoustic response in order to generate a first signal, measure a residual noise, which is formed as a result of an interaction between noise prevailing in the space and the antinoise supplied into the space, process the residual noise with the weighting function in order to generate a second signal, filter the noise reference adaptively, whereby the adaptive filtering is controlled based on the first signal and the second signal so that the second signal is minimised, and the adaptively filtered signal is supplied as antinoise into the space.

2. A method according to claim 1, characterised in that a noise reference is generated so that the adaptively filtered signal treated with the estimate function of the electroacoustic response is subtracted from the residual noise signal.

3. A method according to claim 1, characterised in that coefficients $w_k$ of an adaptive filter function used for the adaptive filtering of the noise reference are determined by formula:

$$w_k[n+1]=w_k[n]-2\mu e_H[n]r_H[n-k]$$

where n is a sampling moment of a digital filter, $\mu$ is a constant step length, $e_H$ is the second signal, and $r_H$ is the first signal.

4. A method according to claim 1, characterised in that said weighting function is a function which takes into account frequency sensitivity of the human hearing, whereby it generates a maximum total attenuation of the noise at a frequency of substantially 1000 Hz.

5. A method for attenuating noise in a space by generating antinoise, wherein the method comprises the steps to:

determine a noise reference, determine a weighting function, determine an estimate function of an electroacoustic response of the space, process said noise reference with said weighting function and with said estimate function in order to generate a first signal, measure a residual noise, process said residual noise with said weighting function in order to generate a second signal, filter said noise reference adaptively for producing an antinoise signal, whereby the adaptive filtering is controlled based on said first signal and said second signal so that said second signal is minimised, and in said step to determine a noise reference, said noise reference is determined by processing said antinoise signal by said estimate function of the electroacoustic response and subtracting the result from said residual noise signal; and coefficients $w_k$ of an adaptive filter function used for said adaptive filtering of the noise reference are determined by formula:

$$w_k[n+1]=w_k[n]-2\mu e_H[n]r_H[n-k]$$

where n is a sampling moment of a digital filter, $\mu$ is a constant step length, $e_H$ is said second signal, and $r_H$ is said first signal.

* * * * *

UNITED STATES PATENT AND TRADEMARK OFFICE
CERTIFICATE OF CORRECTION

PATENT NO. : 6,275,592 B1  
DATED : August 14, 2001  
INVENTOR(S) : Vartiainen

Page 1 of 1

It is certified that error appears in the above-identified patent and that said Letters Patent is hereby corrected as shown below:

<u>Column 8, claim 1,</u>  
Line 30, "weighing" should read -- weighting --.

Signed and Sealed this

Nineteenth Day of March, 2002

Attest:

JAMES E. ROGAN  
*Director of the United States Patent and Trademark Office*

*Attesting Officer*